J. R. MILLER.
TRUCK COUPLING.
APPLICATION FILED AUG. 18, 1919. RENEWED MAR. 18, 1921.
1,395,288.
Patented Nov. 1, 1921.
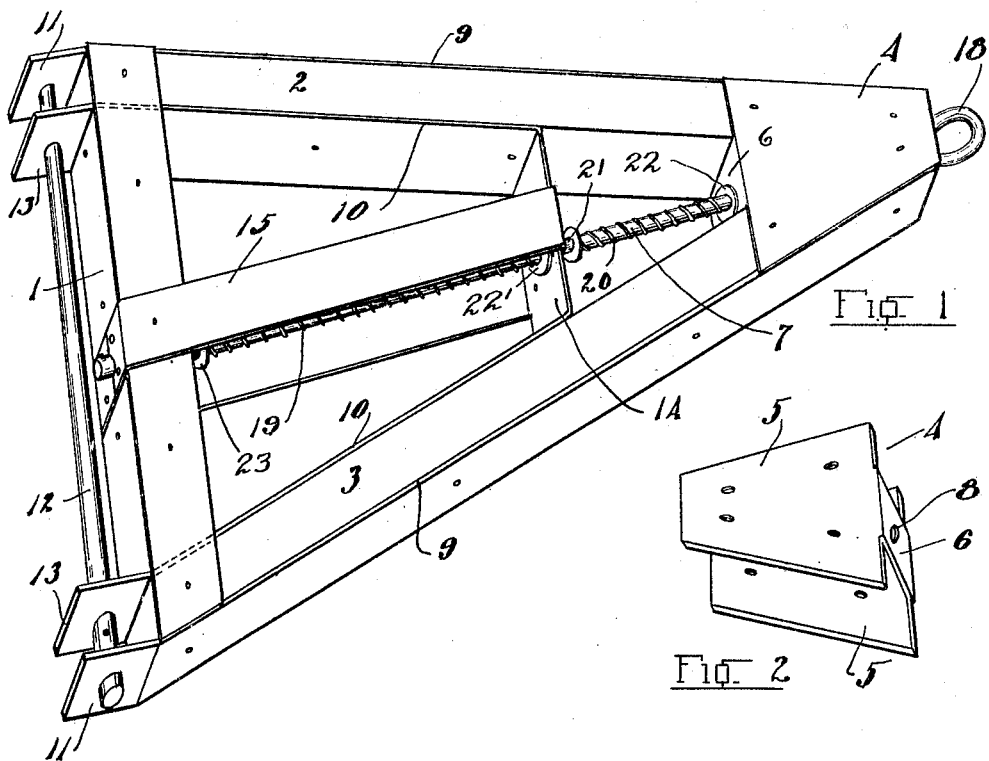
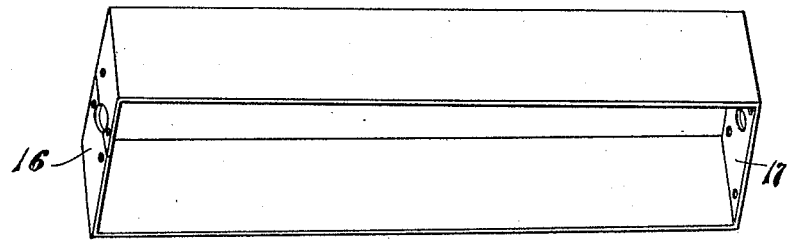
Inventor
John R. Miller
By Herbert E. Smith
Attorney

UNITED STATES PATENT OFFICE.

JOHN R. MILLER, OF SPOKANE, WASHINGTON, ASSIGNOR OF ONE-HALF TO DELBERT A. MILLER, OF THORNTON, WASHINGTON.

TRUCK-COUPLING.

1,395,288.     Specification of Letters Patent.     Patented Nov. 1, 1921.

Application filed August 18, 1919, Serial No. 318,267. Renewed March 18, 1921. Serial No. 453,478.

*To all whom it may concern:*

Be it known that I, JOHN R. MILLER, a citizen of the United States, residing at Spokane, in Spokane county, and State of Washington, have invented certain new and useful Improvements in Truck-Couplings, of which the following is a specification.

The present invention relates to an improved truck coupling for vehicles, and especially, a coupling for connecting the trailer to a hauling or towing truck, the primary object of the invention being the provision of such a coupling, embodying also a resilient draw bar, for use in towing a trailer whose front wheels are pivoted or swiveled. By the utilization of my device I am enabled to produce a strong, rigid, and durable coupling member between the towing and the towed vehicle, for use in heavy hauling, to insure facile turning, and proper tracking of the rear vehicle wheels with the front vehicle wheels.

The invention consists in certain novel combinations and arrangements of parts for providing the above indicated equipment, as will be pointed out and claimed in the accompanying specification and claim.

In the accompanying drawings I have illustrated one complete example of the physical embodiment of my invention, the parts being combined and arranged according to the best mode that I have so far devised for the practical application of the principles of my invention, and such embodiment has been successfully tested in actual use and found satisfactory in performing its functions.

Figure 1 is a perspective view of the coupling member as in actual use, and embodying the novel combinations and constructions of the invention.

Fig. 2 is a perspective view of the metallic head plate of the coupler.

Fig. 3 is a perspective view of the metallic draw bar frame or strap forming part of the coupler.

In the preferred form of the invention as depicted in the drawings I have utilized a combined wood and metal construction, although, under some conditions, a complete metallic structure, of tubular members may be used, and the A-frame illustrated herein has proven highly satisfactory in heavy hauling.

The rear bolster 1 of the coupler has attached thereto a pair of converging side bars 2, 3, of wood beams, and the apex of the triangular frame, or its head, is capped by the metallic head plate 4 which is constituted by the upper and lower members 5, 5, and the front vertical post 6. The draw bar 7 passes through a perforated part of the web, as at 8, and the coupling head, through its plates strengthens the coupling frame, while the riveted or bolted parts make a compact and rigid head member for the coupler.

The outer and inner walls of the coupler frame are provided with metallic sheathing or straps as 9 and 10 respectively, the outer strap passing around the two side bars and the head of the coupler (where it is perforated for the draw bar) and having its end extensions 11 beyond the rear face of the bolster 1 forming perforated bearing plates for the coupling pin 12. Similarly, the reinforcing strap or sheathing 10 has its ends 13 perforated and positioned parallel with the plates or ears 11 to support the coupling pin 12 that extends transversely of the vehicle and parallel with and at the rear of the bolster 1. The metallic sheathing straps conform in shape and size to the wood side bars and bolster of the frame, and the strap 10 is fashioned with a cross brace 14, also perforated for the draw bar and acting as a guide therefor, in the towing and buffing movement of the towing vehicle and its trailer.

A metallic, rectangular frame 15 is also used in connection with the draw bar, and is situated centrally of the coupler and extending longitudinally thereof with its ends 16, 17, perforated for the draw bar, and forming a box frame or brace for the draw bar. At the front the box frame 15 incloses the cross brace 14, and at the rear it incloses the bolster 1, so that the bearings of the draw bar are all of metal, or in other words, all the bearings for the bar are reinforced with metallic straps or plates. At the head of the coupler the draw bar is directly connected to the towing truck or vehicle by utilizing the eye 18, and the shock of pulling or buffing is taken up by the two resilient members or springs 19 and 20, the former being located on the draw bar between the bolster and cross brace, and the latter or shorter spring being located on the bar between the rear of the coupler head and the cross brace. The spring 20 is coiled about the draw bar 7 and is interposed between a collar 21 fixed on the bar and a forward washer 22 at an opening in the plate 6 between the two inner straps 10 10, the bar being adapted to move freely through the washer and plate 4'. The rear spring 19 is coiled about the draw bar and interposed between a loose washer 22' at the cross brace 14 and the fixed collar 23 on the bar. Preferably the pull springs are arranged so that one receives the shock of pulling before the other, so that the shock of starting will be gradually absorbed by the springs between the fixed collars and frame thus affording an easy movement in starting the trailer, without jerking or tugging.

At the rear the coupler is connected in usual manner to the trailer by utilizing the transverse coupling pin 12 which is supported in the four bearing plates or ears 11 and 13, thus affording a wide base for the pull on the trailer and making a stable connection therewith, well braced, strong and durable.

The parts are all securely bolted or riveted together, the rivets passing through the wood beams and metallic straps, thus making a strong but comparatively light construction.

What I claim is—

The combination in a coupler including a bolster and converging side bars comprising outer and inner straps having extended perforated ends for a transverse coupling pin, of a draw bar and its coupling eye, a cross brace integral with said inner strap, a rectangular frame bar overlapping said cross brace and the bolster and perforated for reception of the draw bar, and springs in connection with the draw bar for absorbing shocks.

In testimony whereof I affix my signature.

JOHN R. MILLER.